EXAMPLE VIII

Hydrogen fluoride is recovered effectively from a gas stream containing 5,000 ppm of HF by using the procedure of Example III with sodium fluoride deposited as the reagent on activated carbon.

EXAMPLE IX

Ethyl mercaptan is recovered from a gas stream containing 0.1–0.4% of the mercaptan in air by using the procedure of Example IV with tripotassium phosphate as the reagent deposited on the support. When vapor streams are used containing propyl mercaptan, methyl mercaptan and butyl mercaptan, respectively, similar effective results are obtained.

EXAMPLE X

Hydrogen cyanide is recovered from an air stream containing 5% hydrogen cyanide using the procedure of Example IV except that tetrachlorodiphenyl is the complex-former deposited on the chromosorb, the absorption temperature is about 90° F. (32° C.), and the desorption temperature is about 150° F. (65° C.). The exhaust gas has less than one part per million of HCN therein.

As indicated above the thermally decomposible bisulfites and bicarbonates are reconverted to the sulfites and carbonates respectively by heating in the range of 250°–400° F. for the bisulfites and in the range of 200°–350° F. for the bicarbonates. The sulfur dioxide and the carbon dioxide respectively are regenerated by such heating.

It is generally satisfactory for desorption purposes with true complexes to raise the temperature at least 20° C., preferably 30°–60° C. above the maximum temperature at which absorption occurs. As a general rule, absorption is effected in the range of 40° C. to 200° C., preferably 20°–80° C. with the desorption temperature being increased at least 20° C., preferably at least 30°–100° C. over the maximum absorption temperature.

In place of the various supporting means used in the above examples, various other supporting materials can be used on which to deposit the reagent or complex forming component. These include: granulated brick, alumina, activated carbon, silica gel, "Teflon," sodium chloride, "Celite," talc, zeolites, diatomaceous earths, etc. For example, satisfactory results are obtained when the procedure of Example IV is repeated using the foregoing materials respectively in place of activated carbon.

Likewise, other regenerating or recovery gases can be used in place of the steam. These can vary according to the particular system and advantageously are easily condensible vapors which are not reactive with the solute gas component. Indirect heating can also be used in combination with the regenerating gases with resultant smaller quantities of elution gas required or indirect heating can be used in combination with a vacuum placed on the system for recovery of pure solute gas.

One of the surprising aspects of this invention is the fact that even though the deposited or adsorbed complexforming reagent is believed to be in the liquid state, there is no liquid film or liquid phase resistance or delay in diffusion or reaction of the gas component with the reagent. This is reflected in the high value obtained for $K_Ga$ and indicates that the reagent is deposited in a mono-molecular or bimolecular film.

While certain features of this invention have been described in detail with respect to the various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the vapor phase chromatographic separation of sulfur dioxide from a gas stream comprising the steps of:
   a. passing said gas stream into contact with a substantially dry absorbent, high surface area solid support material having deposited thereon a compound capable of reacting chemically with sulfur dioxide to form a thermally decomposible molecule and thereby removing sulfur dioxide from the gas stream, said compound being selected from the group consisting of phenols and quinones; and,
   b. recovering said gas stream substantially free of sulfur dioxide by removing it from contact with the support material and the thermally decomposible molecule deposited thereon
   c. regenerating said compound for reuse by raising the temperature of said support material and the thermally decomposible molecule deposited thereon to a temperature above the decomposition temperature of said molecule until substantially all of the sulfur dioxide is driven off and recovered.

2. The process of claim 1 wherein the temperature of the gas stream is about 120°–130°F.

3. The process of claim 1 wherein the temperature is raised to about 240°F for regneration.

4. The process of claim 1 wherein said support material has an extended surface area in the range of 100–300 m²/gm. and said compound is deposited thereon in the amount of about 2 to 25 parts per 100 parts of support material.

5. The process of claim 1 wherein said compound is deposited on said absorbent solid support material by the steps of:
   a. dissolving the compound in an organic solvent to form a solution; and,
   b. gradually stirring into said solution the absorbent solid support material until substantially all of said solution has been absorbed.

6. The process of claim 5 wherein said solution comprises tetrachloro-orthobenzoquinone in benzene and said absorbent solid support material comprises 8–14 mesh alumina.

* * * * *

PROCESS FOR PREPARING MEDIUM DENSITY GRANULAR SODIUM TRIPOLYPHOSPHATE

The present invention relates to a method of preparing granular sodium tripolyphosphate (STPP) having a controlled bulk density. More particularly, this invention relates to a method for treating finely divided STPP particles by an agglomeration technique which, after calcining, results in granules having a bulk density within a desired range of 0.50 to 0.80 grams per cubic centimeter (g./cc.), and improved particle strength or a low degree of frangibility.

Sodium tripolyphosphate (STPP) is commonly prepared by first reacting phosphoric acid and an alkali compound such as sodium hydroxide or sodium carbonate in an aqueous solution such that the mole ratio of sodium to phosphorus is about 1.67:1. This reaction results in a formation of an aqueous mixture of monosodium orthophosphate and disodium orthophosphate in a mole ratio of about 1:2. This mixture is then heated at about 300°C. and STPP is formed therefrom. The reaction proceeds as follows: $NaH_2PO_4 + 2Na_2HPO_4 \rightarrow Na_5P_3O_{10} + 2H_2O$.

The resulting STPP is a crystalline anhydrous product capable of having two physical forms. Form I is produced at temperatures of from about 450°C to 600°C. and Form II at temperatures below about 450°C.

The heating of the orthophosphate feed solution is conventionally carried in either a spray dryer or a rotary kiln. Spray dried products generally have a bulk density of about 0.45 to 0.65 g./cc. Bulk density is the weight of STPP which freely flows into a container of given volume. A convenient method for measuring bulk density is the Solvay Process Method 302A described in the Solvay Technical and Engineering Service Bulletin No. 9 (page 33) issued in 1944.

When STPP is prepared in a rotary kiln, the resulting granular product generally has a relatively high bulk density, that is, in the order of about 0.90 to 1.00 g./cc. Thus, the conventional preparative techniques do not allow for the production of granular STPP in appreciable amounts having a bulk density in the medium range, that is, about 0.55 to 0.75 g./cc. Materials in this range are particularly desirable for the preparation of dry mixed detergent formulations. The present invention provides a process for the agglomeration of finely divided STPP particles in order to form an agglomerated feed which, upon calcining, has a bulk density within the desired range.

Techniques for preparing STPP of various bulk density characteristics are disclosed, for example, in U.S. Pat. Nos. 3,030,180 issued Apr. 17, 1962 to Bigot; 3,233,967 issued Feb. 8, 1966 to Shen; 3,684,436 issued Aug. 15, 1972 to Dear et al. and 3,761,573 issued Sept. 25, 1973 to Hinz et al. The latter mentioned Hinz et al. patent does disclose a technique whereby an alkali metal orthophosphate solution is sprayed onto granulated alkali metal tripolyphosphate particles, however, the technique is directed toward the production of high density STPP.

In accordance with the present invention, there is provided a process for preparing granular STPP having a controlled medium range of bulk density which comprises spraying onto rotating finely divided STPP particles having a size distribution of at least 50% by weight −100 mesh, the balance comprising 0–25% −50 +100 mesh and 0–25% +50 mesh, an aqueous spray solution of sodium orthophosphate having an Na to P molar ratio of 1.67 to 1 and having a concentration of from about 20 to 65% by weight dissolved phosphate solids until the total amount of dissolved solids sprayed is between about 8 and 15% by weight based on the total weight of STPP to be produced, to form an agglomerated product, and calcining the agglomerated product at a temperature of from 300° to 600°C. to produce granular STPP having a bulk density of about 0.50 to 0.80 g./cc. and a particle size distribution of −20 +100 mesh (U.S. Standard).

The process of the present invention may be used in connection with rotary dried or sprayed dry finely divided STPP particles and either Form I (Phase I) or Form II (Phase II) STPP product or mixtures thereof within the desired bulk density range may be produced depending upon the temperature and extent of calcination.

The STPP feed material which is subjected to agglomeration and calcining in accordance with the present invention is finely divided STPP which contains substantial proportions of −100 mesh (U.S. Standard) particles. The feed material should contain at least 50% by weight −100 mesh, 0 to 25% by weight −50 +100 mesh and 0 to 25% of particles having the size greater than 50 mesh. Preferably, the finely divided feed material will contain at least about 80% of −100 mesh particles, better still 90 to 100% −100 mesh particles. Screen undersize particles from a conventional STPP spray drying process comprise a particularly suitable starting material. Feed material having these particles size distributions will be sufficient to produce significant yields of a granular product which, after calcination and screening, has a particle size −20 +100 mesh.

Agglomeration is carried out by first providing a suitable rotary kiln agglomerator or dryer apparatus and setting the finely divided STPP particles into rotary motion and spraying the particles with a hot aqueous solution of sodium orthophosphate. This solution is maintained at a temperature of from about 60° to 120°, preferably about 90° to 110°C. The orthophosphate solution will have a Na to P molar ratio of 1.67 to 1 which is stoichiometrically required to produce sodium tripolyphosphate upon calcination.

A preferred embodiment resides in carrying out the spray agglomeration in a rotary calciner which is maintained at calcination temperatures, that is, about 300° to 600°C. In this preferred technique calcination of the agglomerated feed material takes place immediately and there is no need for any intermediate drying steps. In this preferred embodiment, the agglomeration and calcination is essentially a one step continuous process.

A particularly preferred embodiment resides in maintaining the calciner at a temperature of between about 410° and 460°C, as measured by the exit gas temperature, in order to produce finished STPP granules which contain about 15 to 45% by weight Phase I STPP.

It has been found that the concentration of the orthophosphate spray solution should be at least about 20% by weight in order to prepare an agglomerated feed which upon calcination will have a bulk density within the desired range. Concentrations between about 20 to 65% by weight orthophosphate solids are generally suitable with the preferred range being about 30 to 60% by weight. When the process of the present invention is carried out in its preferred form, that is, by spraying the orthophosphate solution onto finely diand then screened to separate the −20+100 mesh high density granular fraction. After removing the oversize and granular fractions, the screen undersized product of this operation contained 7% by weight of −20+80 mesh, 8% −80+100 mesh, and 85% −100 mesh particles. Two 10,000 gram portions of this finely divided feed were agglomerated using the same rotary drum-agglomerator as in Example 1. In the first run, the spray solution concentration was 27.2% by weight orthophosphate solids, the amount of solution sprayed was 30.0% based on STPP and the quantity of solids sprayed was 10.4% by weight. Agglomerate product was calcined, cooled and screened as in Example 1. In the first run, the granular yield was 80% of −20+100 mesh granules having a bulk density of 0.73 g./cc. and a frangibility of 6%. In the second run, the solution concentration was the same but the quantity of solution sprayed was 37.2%, the total amount of solids sprayed was 13.1%. The granular yield in the second run was 90% of −20+100 mesh particles having a bulk density of 0.71 g./cc. and a frangibility value of 3%.

EXAMPLE 6

Another finely divided Phase I STPP was obtained by using screen undersize particles from a commercial spray drying process. The screen undersize feed material contained about 40% by weight −50+100 mesh and 60% −100 mesh particles. This screen undersize was fed continuously into an internally heated 30 feet long and 6.5 feet diameter rotary calciner. Heating was effected with a natural gas flame at the inlet of the calciner. The calciner had an exit gas temperature of about 425°C. Agglomeration was carried out by spraying onto the rotating STPP particles, a orthophosphate feed solution containing 57.8% by weight dissolved solids (53% by weight expressed as equivalent weight of STPP). The quantity of solution sprayed was 21% by weight and the total amount of solids sprayed was 11.7% by weight (10.7% by weight expressed as equivalent weight of anhydrous STPP). After calcining the product was screened and separated and as in Example 1 to isolate −20+100 mesh granules. Granular yield was 65% by weight of product having a bulk density of 0.71 g./cc. and a frangibility value of 3%. The product contained about 25% by weight Phase I STPP.

EXAMPLE 7

Example 6 was repeated except that the feed material had a particle size distribution of 20% by weight +50 mesh 30% by weight −50+100 mesh and 50% by weight −100 mesh. Granular yield was 57% by weight and bulk density was 0.68 g./cc.

What is claimed is:

1. A method of preparing granular sodium tripolyphosphate of medium density which comprises spraying onto rotating finely divided sodium tripolyphosphate particles having a size distribution of at least 50% by weight −100 mesh, 0 to 25% by weight −50+100 mesh and 0 to 25% by weight +50 mesh, an aqueous spray solution of sodium orthophosphate having a concentration of from about 20 to 65% by weight until the total amount of dissolved solids sprayed is between 8 and 15% by weight based on the total weight of sodium tripolyphosphate to be produced, to form an agglomerated product and calcining the agglomerated product at a temperature of 300° to 600°C to produce granular sodium tripolyphosphate having a bulk density between about 0.50 and 0.80 grams per cubic centimeter and a particle size of −20+100 mesh.

2. The method of claim 1 wherein the finely divided sodium tripolyphosphate particles contain at least 80% by weight −100 mesh particles.

3. The method of claim 1 wherein the total amount of solids sprayed is at least about 9% by weight.

4. The method of claim 1 wherein the granular sodium tripolyphosphate produced has a bulk density between 0.55 and 0.75 grams per cubic centimeter.

5. The method of claim 1 wherein the process is carried out in a rotary calciner maintained at calcination temperatures of about 300° to 600°C.

6. The method of claim 5 wherein the spray solution has a concentration of between about 45 and 60% by weight.

7. The method of claim 5 wherein the total amount of solids sprayed is between about 9 and 12% by weight.

8. The method of claim 5 wherein the bulk density of the sodium tripolyphosphate granules produced is between about 0.55 and 0.75 grams per cubic centimeter.

9. The method of claim 5 wherein the finely divided sodium tripolyphosphate feed particles are composed of screen undersized particles from a spray dryer.

10. The method of claim 5 wherein the calciner is maintained at a temperature between 410° to 460°C. and the final product contains between about 15 and 45% by weight Phase I sodium tripolyphosphate.

11. The method of claim 5 wherein the aqueous spray solution of sodium orthophosphate is introduced at a temperature between about 90° and 110°C.

* * * * *

UNITED STATES PATENT OFFICE
CERTIFICATE OF CORRECTION

PATENT NO. : 3,932,590

DATED : January 13, 1976

INVENTOR(S) : Raimond Pals, Robert J. Fuchs and John C. Schwartz

It is certified that error appears in the above-identified patent and that said Letters Patent are hereby corrected as shown below:

Column 1, lines 23-24, "$NaH_2 PO_4 + 2Na_2HPO_4 \quad Na_5P_3O_{10} + 2H_2O$" should read --$NaH_2 PO_4 + 2Na_2 HPO_4 \rightarrow Na_5P_3O_{10} + 2H_2O$--.

Column 3, line 65, "product transferred" should read --product was transferred--.

Column 6, line 13, (Claim 1), "between 8" should read --between about 8--.

*Signed and Sealed this*

Twenty-first *Day of* December 1976

[SEAL]

Attest:

RUTH C. MASON
*Attesting Officer*

C. MARSHALL DANN
*Commissioner of Patents and Trademarks*